(12) United States Patent
Lesartre et al.

(10) Patent No.: US 10,355,978 B2
(45) Date of Patent: Jul. 16, 2019

(54) CALCULATING TIMES TO LIVE FOR TRANSACTION REQUESTS

(71) Applicant: HEWLETT PACKARD ENTERPRISE DEVELOPMENT LP, Houston, TX (US)

(72) Inventors: Gregg B. Lesartre, Ft. Collins, CO (US); Derek Alan Sherlock, Ft. Collins, CO (US); Gary Gostin, Plano, TX (US); Nicholas George McDonald, Ft. Collins, CO (US); Alan Davis, Palo Alto, CA (US); Darel N. Emmot, Ft. Collins, CO (US); John Kim, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 20 days.

(21) Appl. No.: 15/626,983

(22) Filed: Jun. 19, 2017

(65) Prior Publication Data
US 2018/0367444 A1    Dec. 20, 2018

(51) Int. Cl.
| H04L 12/26 | (2006.01) |
| H04L 12/823 | (2013.01) |
| H04L 12/841 | (2013.01) |
| H04L 12/733 | (2013.01) |
| H04L 12/721 | (2013.01) |
| H04L 29/08 | (2006.01) |

(52) U.S. Cl.
CPC .......... *H04L 45/20* (2013.01); *H04L 43/0864* (2013.01); *H04L 43/106* (2013.01); *H04L 45/26* (2013.01); *H04L 47/286* (2013.01); *H04L 47/32* (2013.01); *H04L 67/325* (2013.01)

(58) Field of Classification Search
CPC .......................... H04L 43/0864; H04L 45/26
See application file for complete search history.

(56) References Cited

U.S. PATENT DOCUMENTS

| 6,134,217 | A | 10/2000 | Stiliadis et al. |
| 6,414,971 | B1 | 7/2002 | James et al. |
| 6,760,309 | B1 | 7/2004 | Rochberger et al. |
| 7,568,224 | B1 * | 7/2009 | Jennings ............... H04L 63/126 713/161 |
| 7,573,914 | B2 | 8/2009 | Ilnicki et al. |
| 7,596,097 | B1 * | 9/2009 | McCowan .............. H04L 43/00 370/248 |
| 7,860,125 | B2 | 12/2010 | Bains et al. |

(Continued)

OTHER PUBLICATIONS

Cong Liu and Jie Wu, "On Multicopy Opportunistic Forwarding Protocols in Nondeterministic Delay Tolerant Networks," 2012, pp. 1-8, Available at: <pdfs.semanticscholar.org/e9b8/7b08ae2c3d766821aa55f73c865c7768d7d1.pdf>.

(Continued)

*Primary Examiner* — Raj Jain
(74) *Attorney, Agent, or Firm* — Hewlett Packard Enterprise Patent Department

(57) ABSTRACT

Example implementations relate to calculating a time to live (TTL). An example implementation includes receiving a transaction request containing a first time to live (TTL) from a requester. A second TTL for a transaction response may be computed, and a transaction response containing the second TTL may be transmitted.

20 Claims, 6 Drawing Sheets

(56) References Cited

U.S. PATENT DOCUMENTS

| | | | |
|---|---|---|---|
| 8,144,632 B1* | 3/2012 | Chapweske | H04N 7/15 370/238 |
| 9,509,582 B2 | 11/2016 | Le Pallec et al. | |
| 2004/0193881 A1* | 9/2004 | Ayaki | H04L 12/2803 713/168 |
| 2007/0041364 A1 | 2/2007 | Kakadia | |
| 2008/0175149 A1 | 7/2008 | Andrews et al. | |
| 2008/0195719 A1 | 8/2008 | Wu et al. | |
| 2010/0135232 A1 | 6/2010 | Fan et al. | |
| 2011/0072179 A1 | 3/2011 | Lacroute et al. | |
| 2012/0057467 A1 | 3/2012 | Yoshida | |
| 2012/0195322 A1 | 8/2012 | Ramanujam et al. | |
| 2012/0254483 A1 | 10/2012 | Chen | |
| 2014/0043985 A1 | 2/2014 | Hall et al. | |
| 2017/0063705 A1 | 3/2017 | Gilson et al. | |
| 2017/0117978 A1 | 4/2017 | Ko | |

OTHER PUBLICATIONS

European Search Report and Search Opinion Received for EP Application No. 18178626.0, dated Nov. 20, 2018, 7 pages.

\* cited by examiner

CALCULATING TIMES TO LIVE FOR TRANSACTION REQUESTS

BACKGROUND

Transaction requests may be initiated by a requesting node and transmitted across a network for remote processing by a responding node. In other words, a transaction request initiated by a processor at a local node may be transmitted across a network fabric for processing at a remote node. The remote node may subsequently send a response, such as a confirmation of processing, across the network to the local node or to a third node.

In one such example, a requester, such as a processor, may send a transaction request across a network to a responder, such as a memory storage component to facilitate a read/write request. Where the transaction request is a read request, the memory storage component may retrieve the requested read data and transmit the data across the network. Where the transaction request is a write request, the memory storage component may write the data to memory and transmit a confirmation of the fulfilled write request back to the requester.

BRIEF DESCRIPTION OF THE DRAWINGS

Certain examples are described in the following detailed description and in reference to the drawings, in which.

DETAILED DESCRIPTION OF SPECIFIC EXAMPLES

Figure 1:
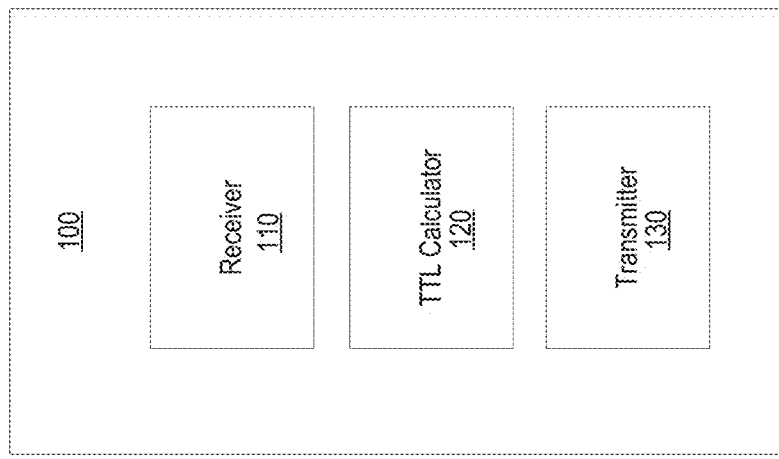
FIG. 1 is a block diagram illustrating an example device for calculating a time to live.

Where the components are communicatively coupled across a network, various methods and/or logic may be implemented to ensure timely communication between the components. These methods and/or logic may ensure that communication between these various components is timely even where the communication traverses a large network fabric having numerous components.

A first node, i.e. a requester, may retransmit a previously transmitted transaction request to a second node, i.e. a responder, where the transaction response was not received by the requester within a threshold period of time. Retransmitting the transaction request increases the chances that the transaction request will be executed. For instance, the previously transmitted transaction request may encounter an error while traversing a network fabric, or the previously transmitted transaction may be victimized by congestion within the network. The requester may retransmit the transaction request if it does not receive an acknowledgement of the request within a retransmission time period, enabling the transaction to ultimately execute.

To ensure that duplicate transaction requests do not exist in the fabric, the system may ensure that the previously transmitted transaction request is dropped or discarded. Otherwise, incorrect system operations may result. For instance, a transaction may execute more than once when intended to execute a single time, which may for example, result in data inconsistencies. Therefore, a previously transmitted transaction is dropped or discarded prior to expiration of the requestor's retransmission timer.

In order to minimize the time between retransmission attempts, while providing a transaction request adequate time to reach its destination and execute, the lifetime of the transaction request may be limited. Specifically, the age of a transaction request may be tracked at various points in its progression across a network fabric, and the transaction request may be dropped or discarded where the transaction request does not reach a predetermined checkpoint prior to the expiration of a budget time. The requester may wait a period of time before retransmitting the transaction request, hereinafter referred to as a retransmission time.

In an example, a transaction request may be assigned an initial time to live (TTL) prior to transmission by a requester. The TTL may be a value indicating the time a transaction request may live before being dropped or discarded. The transaction request may be transmitted across a network in the form of a transmission packet carrying data, and the transaction request may carry a TTL within a field of the transmission packet as the transaction request traverses a network.

To illustrate, a requester may assign a TTL of time t1 to a transaction request. The requester may have a retransmission time of r such that the requester, at time r, will retransmit the transaction request. Where a remote node, i.e. a responder, receives the transaction request after time t1 has transpired, the responder may drop or discard the transaction request, and the requester may retransmit the transaction request at time r. Conversely, where the responder receives the transaction request prior to time t1 expiring, the responder may execute the transaction request.

The TTL of the transaction request may be decremented as the transaction request traverses the network fabric. For example, a transaction request destined for a remote node may first be transmitted to a switch within the network. The switch may manage transaction requests transmitted by any number of requesters. For instance, the switch may, route transaction requests toward their destination and prioritize the order in which to send the transaction requests.

A way in which the switch may manage transaction requests may include decrementing time from a TTL of a transaction request in the switch. To do so, the switch may track the time the transaction request remains within a queue of the switch. The switch may assign a first time stamp to the transaction request upon receipt of the transaction request, and a second time stamp to the transaction request prior to transmission of the transaction request. The switch may determine the difference between the second time stamp and the first time stamp and may decrement time from the TTL of the transaction request corresponding to that difference. The transaction request may travel through any number of switches as the transaction request traverses the network fabric, and each switch may decrement time from the TTL of the transaction request for the time spent in the switch. Thus, the TTL of the transaction request may reflect the time the TTL spends traversing the network fabric.

Because the TTL of the transaction request may be decremented as the transaction request travels from the requester to a destination node, such as a responder, the responder may receive the transaction request with a TTL that is less than was the TTL of the transaction request upon transmission by the requester. In an example, the TTL being a value equal to zero may indicate that the transaction request was not received by the responder within the budgeted time. The responder, responsive to receiving a transaction request with a TTL equal to zero, may drop or discard the transaction request.

Conversely, the TTL being a value greater than zero may indicate that the transaction request was received by the responder within the budgeted time. In an example, a responder that receives a transaction request with a TTL greater than zero may queue the transaction request for execution. In an example, the responder may assign a time to execute to the transaction request, such that the transaction request has a budgeted time to execute prior to being dropped or discarded. In an example, the responder, like the switch as described above, may assign a first time stamp to the transaction request upon receipt of the transaction request, and a second time stamp to the transaction request upon execution of the transaction request, or just prior to execution of the transaction request. The responder may determine the difference between the second time stamp and the first time stamp, and may decrement time from the time to execute corresponding to the difference. In an example, the transaction request may be dropped or discarded where the time to execute reaches 0. In another example, a negative time to execute of the transaction request may be recorded.

Upon executing the transaction request, the responder may send a transaction response in the form of a confirmation of the execution, an output of the execution, etc., back to the requester, and/or to another remote node. A return TTL may be assigned to the transaction response, the return TTL being a budgeted time for the transaction response to be received by the requester and/or another remote node. In one example, where the requester and/or the other remote node receives the transaction response with an expired return TTL, the requester and/or the other remote node may drop or discard the transaction response.

As described herein, various time budgets may be assigned to transaction requests or transaction responses in the form of a TTL to ensure the transaction requests or transaction responses reach various checkpoints within a period of time. For instance, a request TTL may be assigned to a transaction request to budget the amount of time the transaction request has to travel from a requester to a responder, a time to execute may be assigned to a transaction request to budget the amount of time the transaction request has to execute, and/or a return TTL may be assigned to a transaction request to budget the amount of time a transaction response has to travel from the responder to the requester and/or a different node. In an example, these various budgets may be adjusted based on the progression of the transaction request. For instance, time may be borrowed or lent from one process to another process where more or less time transpires during a process than was budgeted.

FIG. 1 is an example device 100 for borrowing or lending a TTL between processes. Device 100 may be a node within a network, such as a responder. In an example, the responder may be a memory management device for storing and managing the storage of data. Device 100 may include a processor, such as a central processing unit (CPU), an integrated circuit such as an ASIC (application-specific integrated circuit), or an FPGA (field-programmable gate array). Any of the components of device 100 may be implemented as a combination of electronic circuitry (i.e., hardware) and/or software/firmware executed by a processor. For example, device 100 may include an integrated circuit customized to offer the functionality of TTL borrowing and/or lending. The machine-readable storage medium may be a non-transitory storage medium (e.g., random access memory (RAM), non-volatile random access memory (NVRAM), flash memory, etc.).

Device 100 may include a receiver 110 for receiving a transaction request transmitted from a requester. The received transaction request may include a first TTL. In an example, the received first TTL may indicate a time remaining for the received transaction request prior to the transaction request being dropped or discarded. The received first TTL may have been decremented as the first TTL traversed a network from the requester to the receiver such that the first TTL received by the responder may be a value that was less than the value of the first TTL when transmitted by the requester.

Device 100 may also include a time to live calculator 120. The time to live calculator may compute a second TTL for a transaction response. In an example, the computed second TTL may be a summation of the first TTL as received by the requester and a return time budget. Thus, extra time remaining for the received transaction request to have been received by device 100 may be added to a return budget for a transaction response. In this way, a response phase borrows time from the request phase such that transaction response has a greater time to travel back to the requester or to a third node than a budgeted default return time.

Device 100 may also include a transmitter 130 to transmit the transaction response containing the second TTL. The transaction response may be transmitted as a packet, and may be a confirmation of an execution of the transaction request, an output of an execution of the transaction request, etc. In an example, the transmitter 130 may transmit the transaction response back to the requester to confirm to the requester that the transaction request was received and executed within the time allocated.

Any number of nodes may be implemented for executing the transaction request. Although an instance of one such node for implementing time to live borrowing between processes is described above, any number of nodes may be implemented for executing a transaction request and time to live borrowing between processes. For example, transmitter 130 may transmit the transaction response to a third node to further execute the transaction request and may additionally transmit an acknowledgment that the transaction request was executed back to the requester. The third node may receive the transaction response and implement any of the time borrowing processes as described herein, such as receiving the transaction response with the second TTL, computing a third TTL that is a summation of the second TTL as received and a second return time budget, and transmitting the third TTL to the requester or to a fourth node.

Figure 2:
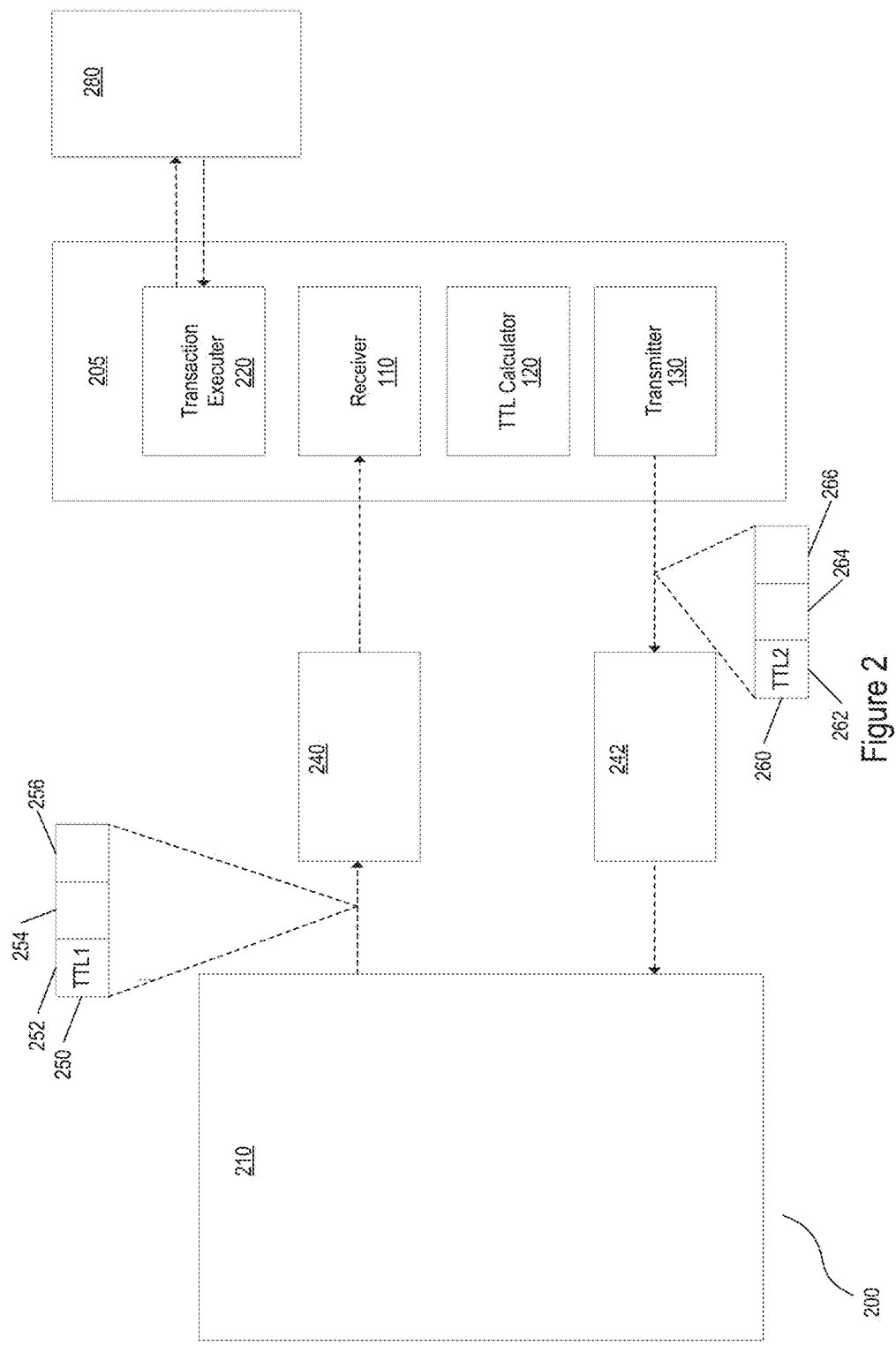
FIG. 2 is a block diagram illustrating an example of a device for calculating a time to live in a network.

FIG. 2 is a block diagram illustrating a network 200 including a device for borrowing or lending a TTL between processes. Elements of device 100 as described in FIG. 1 may be incorporated within device 205 as implemented in network 200, including receiver 110, TTL calculator 120, and transmitter 130 of device 100. Requester 210 may be in communication with device 205 over network 200. Requester 210 may transmit a transaction request to device 205. The transaction request may be transmitted as a packet, e.g. transaction request packet 250. Transaction request packet may include any number of fields, e.g. fields 252, 254, 256, and the transaction request may be transmitted by the requester with a first time to live (TTL1) stored within a field of the transaction request packet, e.g. field 252.

Transaction request packet 250 may be transmitted to device 205 across a network fabric. The network fabric may include any number of switches for routing packets. For purposes of illustration, two example switches, switch 240 and switch 242, are shown. Switch 240 may receive transaction request packet 250 and may route transaction request packet 250 to device 205. In other examples, a switch may route a transaction request packet to another switch in the network fabric. Switch 240, prior to transmitting transaction request packet 250 to device 205, may decrement time from TTL1 of transaction request packet 250. Specifically, time may be decremented from TTL1 corresponding to the amount of time the transaction packet was held within switch 240. In this way, switches within the network fabric may track the age of a transaction request traversing the network.

As indicated in FIG. 2, transaction request packet 250 may be received by receiver 110. In an example, receiver 110 may drop or discard transaction request packet 250 where TTL1 of transaction request packet 250 indicates that the time budgeted to travel from the requester to device 205 was exceeded. For instance, transaction request packet 250 may be dropped or discarded where TTL1 of the transaction request packet 250 is a value equal to 0. Where TTL1 of transaction request packet 250 is greater than 0, TTL calculator 120 may add the value of TTL1 received by the requester to a budgeted time for transmitting a transaction response.

In an example, the transaction request sent within transaction request packet 250 may wait in a queue for execution within device 205. Receiver 110 may assign a first timestamp to transaction request packet 250 upon receipt and may assign a second timestamp to transaction request packet 250 just prior to execution of the transaction request. Like the switch described above, TTL calculator 120 may decrement a value of TTL1 corresponding to the time spent by the transaction request within the device prior to execution, e.g. the time spent by the transaction request within the device queue. In an example, the transaction request may be dropped or discarded just prior to execution where TTL1 of the transaction request just prior to execution is a value equal to or less than 0. Thus, in an example TTL1 may be a budget time from a time the transaction request is transmitted from the requester to traverse a network fabric to the device, to a time the device receives the transaction request, and/or TTL1 may be a budget time from a time the transaction request is transmitted from requester 210 to device 205, to a time device 205 begins executing the transaction request.

Where the transaction request executes and TTL1 has not expired, transmitter 130 may transmit a transaction response. FIG. 2 illustrates transmitter 130 transmitting a transaction response in the form of packet 260 having example fields 262, 264, and 266. Transmitter 130 may transmit transaction response packet 260 with a second time to live (TTL2), e.g. as calculated by TTL calculator 120. As an example, FIG. 2 illustrates transmitter 130 transmitting TTL2 within field 262 of packet 260.

In an example, transmitter 130 transmits the transaction response containing TTL2 where TTL2 is a value greater than zero. Conversely, transmitter 130 may not transmit the transaction response where TTL2 is a value less than or equal to zero. In an example, TTL2, as calculated by TTL calculator 120, may be compared to a return budget, e.g. a budgeted time for the transaction response to traverse the network. Transmitter 130 may not transmit the transaction response where TTL2 is a value less than the return budget. Conversely, transmitter 130 may transmit the transaction response where TTL2 is a value equal to or greater than the return budget.

Where transmitter 130 does transmit the transaction response, transmitter 130 may transmit the transaction response such that transaction response packet 260 traverses any number of nodes, e.g. switches, responders, etc., within the network fabric. In this example, transaction response packet 260 may pass through switch 242, which, like switch 240 as described above, may track the age of transaction response packet 260 by decrementing time from TTL2 corresponding to the time transaction response packet 260 spent within switch 242.

In an example, switch 242 may manage a multitude of incoming and outgoing transaction requests. The switch may manage each encountered transaction request sequentially, such that incoming transaction requests are queued within the switch prior to transmission. In an example, switch 242 may implement age-based arbitration logic to prioritize transaction requests within the queue such that transaction requests having the shortest TTLs are dequeued before transaction requests having longer TTLs. In another example, switch 242 may order transaction requests within the queue in the order in which the transaction requests were received by switch 242.

The transaction request may be assigned an execution budget in addition to the transaction request having a first time to live budget time for traversing the network. In an example, the execution budget may be a budget time for device 205 to execute the transaction request. Device 205, may, for example, include a transaction executor 220 to execute the received transaction request. The transaction request may be a read and/or write request and transaction executor 220 may be a memory controller for executing the read and/or write request by reading and/or writing to memory, e.g. memory 280. In an example, where transaction executor 220 does not execute the transaction request within the budgeted execution time, the transaction request may be dropped or discarded and a transmission response may not be sent by transmitter 130.

In another example, the execution time of the transaction request may be compared to the execution budget, and any time to execute that differentiated from the execution budget may be borrowed from a return budget. For example, where the execution budget is time b, and the transaction request executes in time x, TTL calculator 120 may calculate TTL2 to be r+(b−x), where r is the return budget. Accordingly, the transaction response may be transmitted to its destination where the transaction response can traverse the network within the shortened return budget time, or the transaction response may be transmitted with an extended return time where the transaction request is executed in less time than was budgeted.

As discussed above, TTL calculator 120 may borrow time from TTL1 for the calculation of TTL2. For instance, TTL2 may be calculated as the summation of a return budget r, and the value of TTL1 as received by receiver 110 or the value of TTL1 just prior to execution. Combining this concept with the example in the paragraph above, we may infer that TTL2 may be calculated to be a summation of TTL1 and the return budget, less a time of execution of the transaction request in excess of an execution budget, i.e. TTL2=TTL1+r+(b−x).

Figure 3:
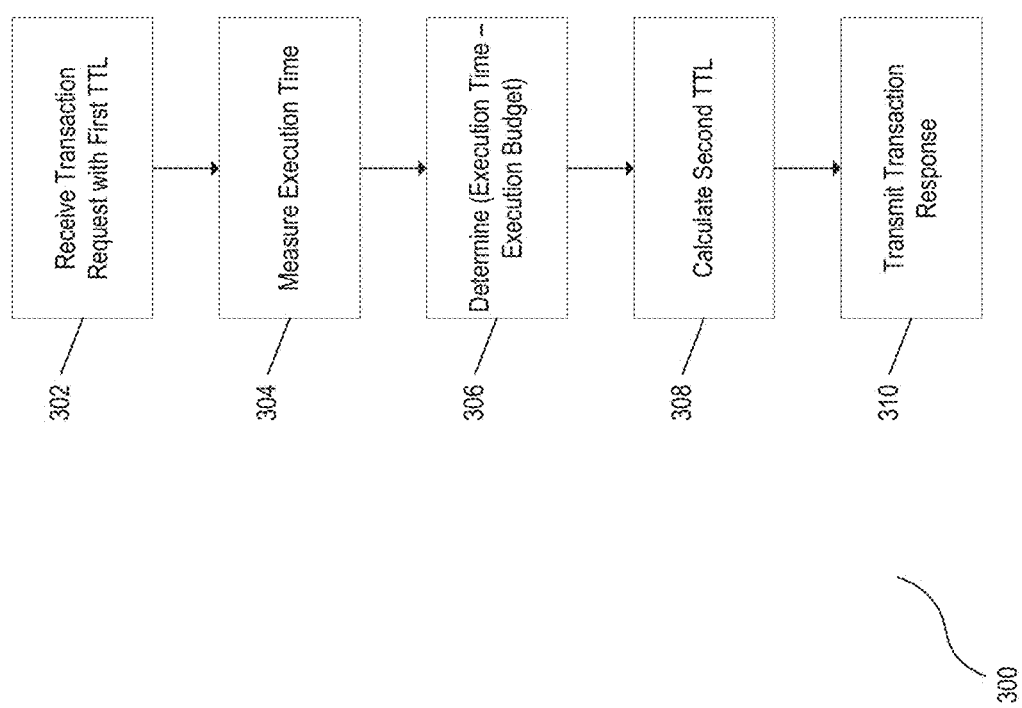
FIG. 3 is a flowchart illustrating an example method for calculating a time to live.

FIG. 3 is a flowchart depicting an example method 300 for time to live borrowing. Method 300 may be executed or performed, for example, by some or all of the system components described above in device 100 of FIG. 1 and device 205 of FIG. 2. Method 300 may be implemented in the form of executable instructions stored on at least one machine-readable storage medium of a system and executed by at least one processor of the system. Alternatively or in addition, method 300 may be implemented in the form of electronic circuitry, e.g. hardware. In some examples, steps of method 300 may be executed substantially concurrently or in a different order than shown in FIG. 3. In some examples, method 300 may include more or less steps than are shown in FIG. 3. In some examples, some of the steps of method 300 may, at certain times, be ongoing and/or may repeat.

At block 302, a transaction request may be received from a requester. In an example, the transaction request may include a first time to live (TTL), such as TTL1 as described in FIG. 2. The transaction request may be received by a responder, such as device 100 as described in FIG. 1 and device 205 as described in FIG. 2.

At block 304, a time to execute the transaction request may be measured, as will be described in greater detail below. The difference between the measured execution time and an execution budget may be determined at block 306. In an example, the execution budget may be configured by an administrator based on a retransmission time of the requester. Specifically, the execution budget may be configured in coordination with a transaction request budget, e.g. assigned as TTL1 by requester 210 in FIG. 2, and a transaction response budget, e.g. included in the calculation of TTL2 by TTL calculator 120 of FIGS. 1 and 2, such that the requester does not receive multiple transaction responses for a retried transaction request. In other words, the execution budget may be configured such that, where the requester was to retransmit the transaction request, the previous transaction request or its corresponding transaction response would be dropped or discarded at some point along its route and would not be returned to the requester.

At block 308, a second TTL may be calculated, e.g. by TTL calculator 120 of FIGS. 1 and 2. In an example, the second TTL calculation may include a summation of the first TTL and a predetermined return time budget. In another example, the second TTL calculation may include a summation of the difference between the execution time and the execution budget and a predetermined return time budget. Thus, the return time budget may be extended by borrowing time from unused budget time of the transaction request traversing the network to the responder, and/or unused budget time from the execution of the transaction request. Once the second TTL is calculated, a transaction response to the transaction request may be transmitted at block 310, e.g. by transmitter 130 of FIGS. 1 and 2.

Figure 4:
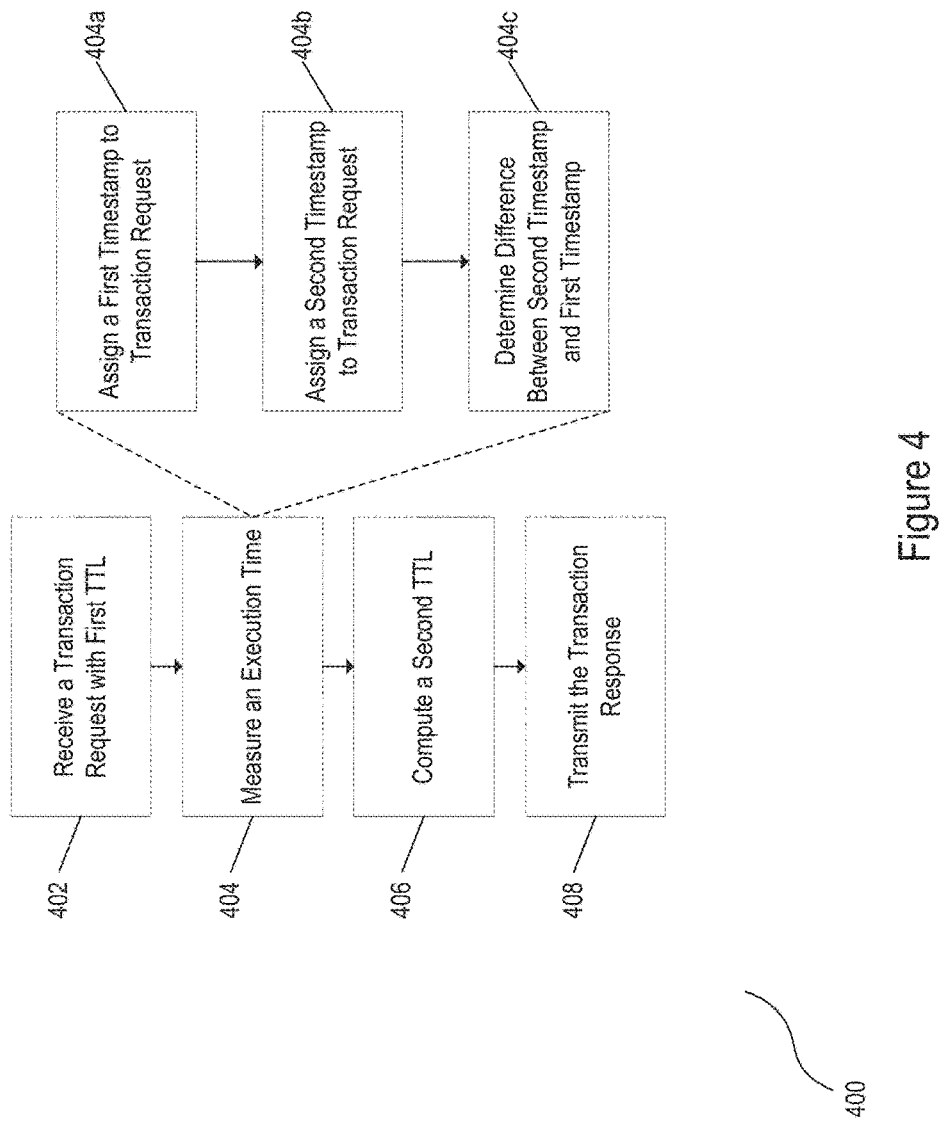
FIG. 4 is a flow chart illustrating an additional example method for calculating a time to live.

FIG. 4 is an additional flowchart illustrating an example method 400 for time to live (TTL) borrowing. Method 400 may be executed or performed, for example, by some or all of the system components described above in device 100 of FIG. 1 and device 205 of FIG. 2. Method 400 may be implemented in the form of executable instructions stored on at least one machine-readable storage medium of a system and executed by at least one processor of the system. Alternatively or in addition, method 400 may be implemented in the form of electronic circuitry, e.g. hardware. In some examples, steps of method 400 may be executed substantially concurrently or in a different order than shown in FIG. 4. In some examples, method 400 may include more or less steps than are shown in FIG. 4. In some examples, some of the steps of method 400 may, at certain times, be ongoing and/or may repeat.

Blocks represented within FIG. 4 may be described with reference to example blocks of FIG. 3. Specifically, blocks 402-408 may be implemented as described in blocks 302-308 above. At block 402, a transaction request with a first TTL may be received, and at block 404, an execution time for the transaction request may be measured.

At block 404 the execution time of the transaction request may be measured by first assigning a first timestamp to the transaction request at block 404a. In an example, the first timestamp may be assigned to the transaction request just prior to the transaction request executing. For instance, the first timestamp may be assigned to the transaction request upon the transaction request being next up in a queue for execution, or upon being dequeued from the queue for execution. Accordingly, the first timestamp may mark the beginning of the execution process for the transaction request.

At block 404b, a second timestamp may be assigned to the transaction request upon execution of the transaction request. The second timestamp may mark the end of the execution process of the transaction request such that the first timestamp and the second timestamp are bookends to the execution process. At block 404c, the difference between the second timestamp and the first timestamp may be determined such that the total execution time for the transaction request may be measured. As described above with reference to FIG. 3, a second TTL may be computed from the measured execution time at block 406, and a transaction response may be transmitted with the second TTL at block 408.

Figure 5:
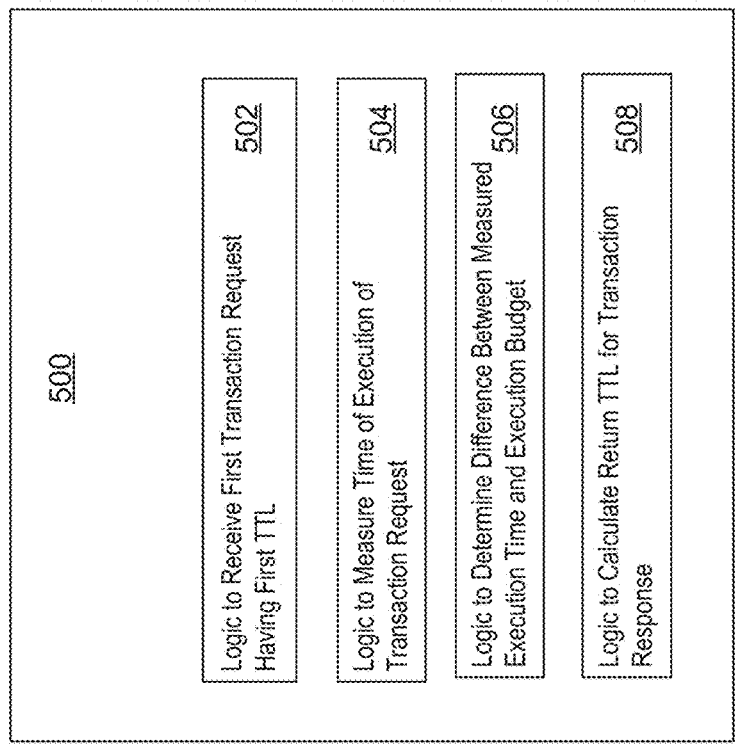
FIG. 5 is a block diagram illustrating an example system for calculating a time to live.
Figure 6:
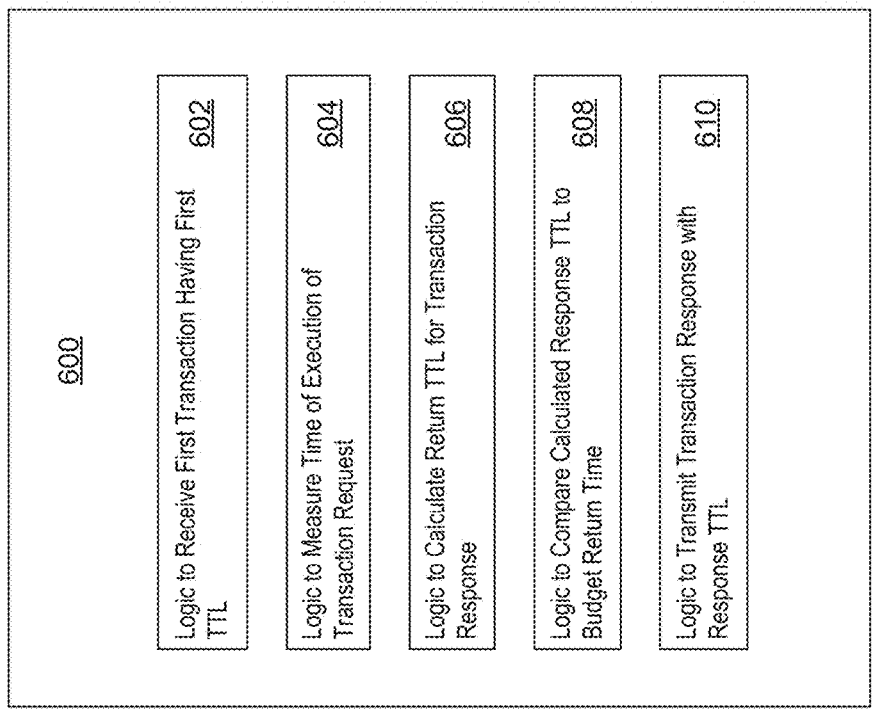
FIG. 6 is a block diagram illustrating an additional example system for calculating a time to live.

FIGS. 5 and 6 are block diagrams of example systems, 500 and 600 respectively, for calculating a time to live. Systems 500 and 600 may include a processor, such as a central processing unit (CPU), an integrated circuit such as an ASIC (application-specific integrated circuit), or an FPGA (field-programmable gate array). Any of the components of system 500 or 600 may be implemented as a combination of electronic circuitry (i.e., hardware) and/or software/firmware executed by a processor. For example, system 500 or 600 may include an integrated circuit customized to offer the functionality of TTL borrowing and/or lending. The machine-readable storage medium may be a non-transitory storage medium (e.g., random access memory (RAM), non-volatile random access memory (NVRAM), flash memory, etc.).

System 500 may include logic 502 to receive a first transaction request having a first time to live. In an example, the received first transaction request may be transmitted from a requester, e.g. requester 210 of FIG. 2. In an example, the first time to live, i.e. the request time to live, may be a budget time from a time the transaction request is transmitted from the requester to traverse a network fabric to the device, to a time the device begins executing the transaction request. In an example, the first time to live may be a budget time from a time the transaction request is transmitted from the requester to traverse the network fabric to the device, to a time the device receives the transaction request.

System 500 may include logic 504 to measure an execution time of the transaction request. The execution time may, for example, be measured as was described in block 404, and specifically as was described in blocks 404a, 404b, and 404c above. Logic 506 may also be included in system 500 to determine a difference between the execution time as measured by logic 504, and an execution budget. In an example, the execution budget may be configured by an administrator based on a retransmission time of the requester. For example, the retransmission time may be a time that the requester waits to receive a transaction response, such that, where no transaction response is received by the requester within the retransmission time, the requester retransmits the transaction request. A properly allocated execution budget may ensure that the requester may not retransmit a transaction response and also receive a transaction response to the previously transmitted transaction request. Accordingly, an administrator may allocate an execution budget that would ensure data consistency within a network system.

Logic 508 may also be provided within system 500 to calculate a return time to live (TTL) for a transaction response to the received transaction request. In an example, the return TTL may include a summation of the difference between the measured execution time and the execution budget and a return TTL budget. In this example, the return TTL budget is extended to account for the extra budgeted time unused by system 500 to execute the transaction request. In this scenario, the return TTL budget may be said to borrow time from the execution budget.

In an example, the return TTL may include a summation of the difference between the measured execution time and the execution time budget, the return TTL budget, and the request TTL when received by the device. In an example, the request TTL when received by the device represents the extra budgeted time unused by the transaction request to traverse the network to system 500, where the budgeted time to traverse the network may be referred to as a request budget. In this example, the return TTL budget is extended to account for the extra budgeted time unused by system 500 to execute the transaction request, and to account for the extra budgeted time unused by the transaction request to traverse the network. In this scenario, the return TTL budget may be said to borrow time from the execution budget, and from the request budget.

System 600 of FIG. 6 may include logic for calculating a time to live. Many of the example logic blocks illustrated in FIG. 6 may be described with reference to example logic blocks of FIG. 5. Specifically, logic 602-608 may be implemented as described in blocks 502-508 above. Logic 602 may be implemented to receive a transaction request having a first TTL, and logic 604 may be implemented to measure an execution time of the transaction request responsive to the transaction request being executed at a device. Logic 606 may be implemented to determine a difference between the measured execution time and an execution budget, and logic 608 may be implemented to calculate a return TTL for a transaction response.

System 600 may also include logic 610 to transmit the transaction response with the return TTL. In an example, logic 610 transmits the transaction response when the calculated response TTL is a value greater than 0. Where the response TTL is calculated to be a value equal to or less than 0, the response TTL may be dropped or discarded by system 600.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A device comprising:
   a receiver to receive a transaction request from a requester, wherein the transaction request contains a first time to live (TTL);
   a TTL calculator, the TTL calculator to, compute a second TTL for a transaction response, wherein the computation includes a summation of the first TTL and a return time budget; and
   a transmitter to transmit the transaction response containing the second TTL.

2. The device of claim 1, wherein the computation includes a summation of the first TTL and a return time budget, less a time of execution of the transaction request in excess of an execution budget.

3. The device of claim 2, wherein the execution budget is a budget time for the device to execute the transaction request.

4. The device of claim 1, wherein the first TTL is a budget time from a time the transaction request is transmitted from the requester to traverse a network fabric to the device, to a time the device receives the transaction request.

5. The device of claim 1, wherein the first TTL is a budget time from a time the transaction request is transmitted from the requester to traverse a network fabric to the device, to a time the device begins executing the transaction request.

6. The device of claim 1, wherein the return time budget is a budget time from a time the transaction response is transmitted from the device to traverse a network fabric to the requester.

7. The device of claim 6, wherein the transmitter transmits the transaction response containing the second TTL where the second TTL is a value greater than or equal to the return time budget, and drops the transaction response where the second TTL is a value less than the return time budget.

8. The device of claim 1, wherein the transmitter transmits the transaction response containing the second TTL where the second TTL is a value greater than zero, and does not transmit the transaction response where the second TTL is a value less than or equal to zero.

9. The device of claim 1, wherein the first TTL is contained within a field of a packet of the transaction request and the second TTL is contained within a field of a packet of the transaction response.

10. A system comprising:
    logic to receive a transaction request having a request time to live (TTL) from a requester;
    logic to, responsive to the transaction request being executed at a device, measure an execution time of the transaction request;
    logic to determine a difference between the measured execution time and an execution budget;
    logic to calculate a return TTL for a transaction response, the return TTL including a summation of the difference between the measured execution time and the execution budget and a return TTL budget.

11. The system of claim 10, wherein the return TTL includes a summation of the difference between the measured execution time and the execution time budget, the return TTL budget, and the request TTL when received by the device.

12. The system of claim 10, further comprising logic to transmit the transaction response with the return TTL when the return TTL is a value greater than 0.

13. The system of claim 10, wherein the execution budget is configured by an administrator based on a retransmission time of the requester, the retransmission time being a time that the requester waits to receive a transaction response, such that, where no transaction response is received by the requester within the retransmission time, the requester retransmits the transaction request.

14. The system of claim 10, wherein the request TTL is a budget time from a time the transaction request is transmitted from the requester to traverse a network fabric to the device, to a time the device begins executing the transaction request.

15. The system of claim 10, wherein the request TTL is a budget time from a time the transaction request is transmitted from the requester to traverse a network fabric to the device, to a time the device receives the transaction request.

16. A method comprising:
receiving a transaction request from a requester, wherein the transaction request contains a first time to live (TTL);
measuring an execution time of the transaction request;
determining a difference between the execution time and an execution budget;
calculating a second TTL for a transaction response, wherein the calculation includes a summation of the first TTL or the difference between the execution time and the execution budget and a predetermined return time budget; and
transmitting the transaction response containing the second TTL.

17. The method of claim 16, wherein the execution time of the transaction request is measured by:
assigning a first time stamp to the transaction request prior to the transaction request executing;
assigning a second time stamp to the transaction request upon execution of the transaction request; and
determining the difference between the second time stamp and the first time stamp.

18. The method of claim 16, wherein the first time to live is a budget time assigned by the requester for the transaction request to traverse a network fabric.

19. The method of claim 16, wherein the transaction request or the transaction response is received by a switch within the network fabric and the TTL of the transaction request is decremented by the switch to account for time spent by the transaction request within the switch.

20. The method of claim 19, wherein the TTL of the transaction request is decremented by the switch to account for time spent travelling from the requester to the switch.

* * * * *